United States Patent

Hatoh et al.

[11] Patent Number: 5,589,287
[45] Date of Patent: Dec. 31, 1996

[54] MOLTEN CARBONATE FUEL CELL

[75] Inventors: Kazuhito Hatoh, Daitou; Junji Niikura, Hirakata; Eiichi Yasumoto, Katano; Takaharu Gamou, Fujiidera, all of Japan

[73] Assignee: Matsushita Electric Industrial Co., Ltd., Kadoma, Japan

[21] Appl. No.: 318,916

[22] Filed: Oct. 5, 1994

[30] Foreign Application Priority Data

Oct. 18, 1993 [JP] Japan .................................. 5-260125
Feb. 9, 1994 [JP] Japan .................................. 6-015524

[51] Int. Cl.⁶ ................................................... H01M 8/14
[52] U.S. Cl. .................. 429/41; 429/16; 429/46
[58] Field of Search ....................... 429/16, 12, 33, 429/46, 103, 40, 41, 218

[56] References Cited

U.S. PATENT DOCUMENTS

| | | |
|---|---|---|
| 4,247,604 | 1/1981 | Marianowski et al. . |
| 4,389,467 | 6/1983 | Singh et al. . |
| 4,581,303 | 4/1986 | Pasco et al. . |
| 4,708,917 | 11/1987 | Swarr et al. . |
| 4,895,774 | 1/1990 | Ohzu et al. ................. 429/35 |
| 5,162,176 | 11/1992 | Herr et al. ................. 429/194 |
| 5,256,498 | 10/1993 | Ohzu et al. ................. 429/16 |

FOREIGN PATENT DOCUMENTS

| | | |
|---|---|---|
| 62-2458 | 1/1987 | Japan . |
| 1-217856 | 1/1987 | Japan . |
| 62-154465 | 7/1987 | Japan . |
| 2-61095 | 12/1990 | Japan . |
| 3-105867 | 5/1991 | Japan . |
| 3-210771 | 9/1991 | Japan . |

*Primary Examiner*—Anthony Skapars
*Attorney, Agent, or Firm*—Cushman Darby & Cushman IP Group of Pillsbury Madison & Sutro LLP

[57] ABSTRACT

In a molten carbonate fuel cell having an anode a cathode which are both porous gas-diffusion electrodes, and an electrolyte making contact with both the electrodes, the cathode includes a metal oxide represented by the formula $Li_xNi_{1-x}O$ ($0.05 \leq x < 0.5$, preferably $0.05 \leq x < 0.2$), and at least one of the cathode and electrolyte contains an alkaline earth metal carbonate. The disclosed cathode has a small solubility in the electrolyte of alkali metal carbonate and a long service life.

6 Claims, 3 Drawing Sheets

MOLTEN CARBONATE FUEL CELL

BACKGROUND OF THE INVENTION

1. Field of the Invention

The present invention relates to a molten carbonate fuel cell, particularly its cathode, and to a method for producing the same.

2. Description of the Prior Art

Molten carbonate fuel cells generally comprise a pair of gas-diffusion electrodes with their current collectors, a positive electrode (cathode) and a negative electrode (anode), an electrolyte which is retained in a porous body provided between both the electrodes and makes contact with both the electrodes and a cell housing to physically retain the cell components.

As a material for the cathode of the molten carbonate fuel cell of this type, a metal oxide represented by the formula $Li_xNi_{1-x}O$ ($0<x<0.05$) has long been employed. In most cases, the raw material of nickel powder or nickel oxide powder is first formed into a state of green tape by means of a doctor blading method and the like, then optionally sintered, and thereafter incorporated in a cell. It is thereafter completed into a porous electrode plate comprising a metal oxide represented by the formula: $Li_xNi_{1-x}O$ ($0<x<0.05$) in the cell, by being doped with lithium supplied from the electrolyte, in other words, by an in-situ oxidation and lithiation of the raw material.

At a step of configuring an operable cathode, namely at the time of so-called "starting procedure of the cell", a gas for preventing oxidation, such as carbon dioxide, an inert gas or a reducing gas is usually introduced with an optional humidifying into a site of the anode, and a mixed gas of air with carbon dioxide (for instance, air:carbon dioxide:= 70%:30%) is supplied into a site of the cathode of the cell. In this case, a carbon dioxide partial pressure of the introduced gas is 0.1 or higher whereas an oxygen partial pressure is 0.2 or lower. The resultant metal oxide of the composition $Li_xNi_{1-x}O$ obtained in this manner by an in-situ lithiation at the time of starting procedure of the cell usually has a value of x which is smaller than 0.05.

The electrode comprising a metal oxide represented by the formula $Li_xNi_{1-x}O$ ($0<x<0.05$) has a high activity for an oxygen reducing reaction which is cathode reaction of the molten carbonate fuel cell and a relatively high conductivity, and thus has widely been employed as a material for the cathode in general.

The nickel oxide and the metal oxide of the composition $Li_xNi_{1-x}O$ ($0<x<0.05$) are however dissolved in the molten alkali metal carbonate which is the electrolyte of the molten carbonate fuel cell as ions including nickel. If it were a simple dissolution, an elution of the nickel from the cathode into the electrolyte would be stopped at a time point when a saturation solubility was reached. The nickel eluted into the electrolyte and existed therein as ions will however be reduced and deposited in the electrolyte as metal nickel, if it is exposed to a reducing atmosphere in the vicinity of the anode. Once it is deposited, the nickel contained in the cathode will continue to be eluted.

If the elution of nickel from the cathode is continued, the cathode will gradually lose its weight, thereby to invite an increase in contact resistance. Further, it will become difficult to maintain a fine structure which is optimum for maintaining a three-phase zone of gas-electrolyte-electrode. Moreover, the nickel deposited in the electrolyte will finally bring a short-circuiting between the cathode and anode. In this manner, the elution of nickel from the cathode is considered to be a great detrimental factor dominating the loss of service life of the cell.

In order to cope with this difficulty, an attempt for suppressing the solubility of nickel has been investigated by adding an alkaline earth metal carbonate or the like to the electrolyte. Although the solubility of nickel can be suppressed to about ½–⅓ of its initial value by this means, the service life of the cell is scarcely prolonged and a sweeping solution for obviating the detrimental factor cannot be reached.

In recent years, there is a continued search in this art for substitution materials such as $LiFeO_2$. Although these materials have a scarce elution into the electrolyte and re-deposition at the vicinity of the anode, they however have a low activity for the oxygen reducing reaction and a low conductivity, and hence, a sufficient cell performance cannot be obtained with these materials.

SUMMARY OF THE INVENTION

It is therefore a primary object of the present invention to provide a cathode which has a very small solubility in the electrolyte of molten alkali metal carbonate, a sufficient activity for the oxygen reducing reaction, and can impart a long service life to the molten carbonate fuel cell configured with this cathode.

It is another object of the present invention to provide a method for producing a molten carbonate fuel cell provided with this cathode.

The present invention provides a molten carbonate fuel cell comprising:

an anode and a cathode which are both porous gas-diffusion electrodes, and an electrolyte making contact with both the electrodes, wherein the cathode comprises a metal oxide represented by the formula $Li_xNi_{1-x}O$ ($0.05 \leq x<0.5$), and at least one of the cathode and the electrolyte contains an alkaline earth metal carbonate.

In the above-mentioned molten carbonate fuel cell, it is preferable for the cathode to comprise a metal oxide represented by the formula $Li_xNi_{1-x}O$ ($0.05 \leq x<0.2$), and particularly by the formula $Li_xNi_{1-x}O$ ($0.1 \leq x<0.2$).

The present invention also provides a molten carbonate fuel cell comprising:

an anode and a cathode which are both porous gas-diffusion electrodes, and an electrolyte making contact with both the electrodes, wherein the cathode comprises a metal oxide represented by the formula $Li_xNi_{1-x}O$ ($0.05 \leq x<0.5$ and particularly $0.05 \leq x<0.2$).

In another aspect of the present invention, it provides a method for producing a molten carbonate fuel cell including an anode and a cathode which are both porous gas-diffusion electrodes, and an electrolyte making contact with both the electrodes, comprising the steps of:

incorporating a raw material for the cathode consisting mainly of nickel hydroxide at the time of assembling the cell, and performing an in-situ oxidation and lithiation of the raw material for converting it into a cathode comprising a metal oxide represented by the formula $Li_xNi_{1-x}O$ ($0.05 \leq x<0.05$) at the time of elevating the temperature of the cell.

In a further aspect of the present invention, it provides a method for producing a molten carbonate fuel cell including an anode and a cathode which are both porous gas-diffusion electrodes, and an electrolyte making contact with both the electrodes, comprising the steps of:

incorporating a raw material for the cathode consisting mainly of at least one substance selected from the group consisting of metal nickel, nickel oxide and nickel hydroxide, and containing lithium hydroxide at the time of assembling the cell, and performing an in-situ oxidation and lithiation of the raw material for converting it into a cathode comprising a metal oxide represented by the formula $Li_xNi_{1-x}O$ ($0.05 \leq x < 0.05$) at the time of elevating the temperature of the cell.

While novel features of the invention are set forth in the preceding, the invention, both as to organization and content, can be further understood and appreciated, along with other objects and features thereof, from the following detailed description and example when taken in conjunction with the attached drawings.

DESCRIPTION OF THE PREFERRED EMBODIMENTS

In a molten carbonate fuel cell comprising a cathode whose material is a metal oxide represented by the formula $Li_xNi_{1-x}O$ ($0.05 \leq x < 0.5$), wherein at least one of the cathode and electrolyte contains an alkaline earth metal carbonate, a solubility of the cathode in the electrolyte is small, and a stable current generating performance can be demonstrated for a long period of time.

The metal oxide represented by the formula $Li_xNi_{1-x}O$ ($0.05 \leq x < 0.5$) is a material having a small solubility in the molten alkali metal carbonate electrolyte. Further, the metal oxide represented by the formula $Li_xNi_{1-x}O$ ($0.1 \leq x < 0.2$) is a material having a particularly small solubility in the molten alkali metal carbonate electrolyte.

However, under a cathode gas atmosphere (air:carbon dioxide=70%:30%) under which a molten carbonate fuel cell is normally being operated, the value x of the metal oxide represented by the formula $LiLi_xNi_{1-x}O$ is gradually decreasing with a progress of time, and after thousand hours, the cell finally reaches an equilibrium state where the value x decreases to about 0.05–0.1. The decreasing velocity of the value x of the metal oxide represented by the formula $Li_xNi_{1-x}O$ can however be reduced by an inclusion of the alkaline earth metal carbonate in at least one of the electrolyte and the cathode, thereby to maintain the value x at about 0.1–0.2 even at the time of reaching the equilibrium state.

As the alkaline earth metal carbonate to be included in the electrolyte or the cathode it is preferable to employ strontium carbonate ($SrCO_3$) or barium carbonate ($BaCO_3$); but magnesium carbonate or calcium carbonate may also be used. Suitable amount of the alkaline earth metal carbonate is, in a case of adding to the electrolyte, 1–10 mole % of the electrolyte [alkaline earth metal carbonate/(alkaline earth metal carbonate+alkali metal carbonate of the electrolyte)], and is, in a case of adding to the cathode, 1–20% by weight of the cathode material [alkaline earth metal carbonate/(alkaline earth metal carbonate+cathode material)].

Moreover, since a synthesis for obtaining the metal oxide represented by the formula $Li_xNi_{1-x}O$ ($0.2 \leq x < 0.5$) is relatively difficult and the oxide represented by the formula $Li_xNi_{1-x}O$ ($0.1 \leq x < 0.2$) is a material having a particularly small solubility in the molten alkali metal carbonate electrolyte, a cathode for the molten carbonate fuel cell having a smaller solubility in the molten alkali metal carbonate electrolyte can be obtained by employing a porous electrode comprising the oxide represented by the formula $Li_xNi_{1-x}O$ wherein the value x is preferably 0.1 or larger but smaller than 0.2, as its main component.

Incidentally, the metal oxide represented by the formula $Li_xNi_{1-x}O$ ($0.05 \leq x < 0.5$) an be synthesized under a condition with a strong basisity. And, the stronger the basisity of the condition is, the larger is the x value of the metal oxide that can be synthesized.

Therefore, in accordance with the present invention, nickel hydroxide having a strong basisity is employed as a main component of the cathode material at the time of assembling the cell, and the cathode comprising the oxide represented by the formula $Li_xNi_{1-x}O$ ($0.05 \leq x < 0.5$) is made by performing an in-situ oxidation and lithiation of the cathode material at the time of elevating the temperature of the cell.

As an alternative, a substance selected from the group consisting of metal nickel, nickel oxide and nickel hydroxide can be employed as the main component of the cathode material. In that case the cathode is configured by mixing at least lithium hydroxide having a strong basisity with the substance at the time of assembling the cell. Thereby the cathode comprising the oxide represented by the formula $Li_xNi_{1-x}O$ ($0.05 \leq x < 0.5$) is made by performing the in-situ oxidation and lithiation of the cathode material at the time of elevating the temperature of the cell. Preferable amount of the lithium hydroxide to be mixed with the cathode material is about 0.05–1 mole for one mole of nickel contained in the cathode material.

Although the oxidation of the cathode material may be performed by utilizing an oxidation reaction with oxygen in air under a heating by elevating the cell temperature, it may be preferable to supply a gas for the oxidization of the cathode material by utilizing a gas supply passage for supplying the oxidizing gas at the time of cell operation. The gas which is supplied to the cathode at the time of cell operation is composed of 70% of air and 30% of carbon dioxide. On the contrary, it may be preferable that a gas which is supplied to the cathode during the in-situ oxidation and lithiation of the cathode material by elevating the cell temperature has an oxygen partial pressure of 0.2 or higher. Otherwise, a gas can be used, wherein a carbon dioxide partial pressure is 0.1 or lower and the balance is air or oxygen. Synthesization of the porous cathode comprising a metal oxide represented by the formula $Li_xNi_{1-x}O$ where the value of x is 0.05 or more is more readily performed, by introducing these gasses into the cathode during elevating the cell temperature.

Further, the lithiation of the cathode material is usually performed by doping with lithium supplied from the lithium carbonate in the molten alkali metal carbonate which is making contact with the cathode under the heating. As the source of lithium for doping into the cathode, a lithium salt such as lithium hydroxide may be added also to the cathode material beforehand.

In accordance with the above-mentioned production method, a porous cathode comprising a metal oxide represented by the formula $Li_xNi_{1-x}O$ wherein the value x is 0.05 or larger can be synthesized at the time of starting procedure of the cell.

Moreover, by keeping the temperature of the cell at from 440° C. to 480° C., where lithium hydroxide (mp.: about 445° C.) melts but alkali metal carbonate (mp.: about 490° C.) does not melt, for 1 hour or longer during the temperature elevating process, the in-situ oxidation and lithiation of the cathode material can sufficiently be performed for further facilitating the completion of the cathode comprising a metal oxide represented by the formula $Li_xNi_{1-x}O$ ($0.05 \leq x < 0.5$).

In the following paragraphs, the present invention will be described in more detail by way of example.

EXAMPLE 1

(Solubility in the Electrolyte)

Table 1 below summarizes the results of soaking or dipping tests performed on oxide materials for constituting the cathode of the present invention, at 650° C. for 5,000 hours for measuring solubilities in the molten alkali metal carbonate. Oxide samples subjected to the soaking or dipping tests are $Li_{0.06}Ni_{0.94}O$, $Li_{0.1}Ni_{0.9}O$, $Li_{0.16}Ni_{0.84}O$, $Li_{0.19}Ni_{0.81}O$, and $Li_{0.45}Ni_{0.55}O$ of the present invention, and $Li_{0.02}Ni_{0.98}O$ and NiO of the comparative examples; and the molten carbonate is an alkali metal carbonate ($Li_2CO_3:K_2CO_3$=62 mol %:38 mol %), optionally added with 10 mol % of strontium carbonate or barium carbonate. The compositions of the materials after the tests are also listed in Table 1. The tests were performed under an atmospheric gas comprising 70% of air and 30% of carbon dioxide. From Table 1, the advantage of the present invention is apparent.

TABLE 1

| Material for the cathode | Additive to the electrolyte (10 mol %)* | Solubility of Ni (mol ppm) | Composition of the material after the test |
|---|---|---|---|
| $Li_{0.06}Ni_{0.94}O$ | None | 3.8 | $Li_{0.06}Ni_{0.94}O$ |
|  | SrCO$_3$ | 3.5 | $Li_{0.06}Ni_{0.94}O$ |
|  | BaCO$_3$ | 3.3 | $Li_{0.06}Ni_{0.94}O$ |
| $Li_{0.1}Ni_{0.9}O$ | None | 2.3 | $Li_{0.07}Ni_{0.93}O$ |
|  | SrCO$_3$ | 1.8 | $Li_{0.1}Ni_{0.9}O$ |
|  | BaCO$_3$ | 1.7 | $Li_{0.1}Ni_{0.9}O$ |
| $Li_{0.16}Ni_{0.84}O$ | None | 2.0 | $Li_{0.09}Ni_{0.91}O$ |
|  | SrCO$_3$ | 1.2 | $Li_{0.15}Ni_{0.85}O$ |
|  | BaCO$_3$ | 1.0 | $Li_{0.16}Ni_{0.84}O$ |
| $Li_{0.19}Ni_{0.81}O$ | None | 1.8 | $Li_{0.1}Ni_{0.9}O$ |
|  | SrCO$_3$ | <0.8 | $Li_{0.17}Ni_{0.83}O$ |
|  | BaCO$_3$ | <0.8 | $Li_{0.18}Ni_{0.82}O$ |
| $Li_{0.45}Ni_{0.55}O$ | None | 3.6 | $Li_{0.1}Ni_{0.9}O$ |
|  | SrCO$_3$ | 2.2 | $Li_{0.19}Ni_{0.81}O$ |
|  | BaCO$_3$ | 1.9 | $Li_{0.2}Ni_{0.8}O$ |
| $Li_{0.02}Ni_{0.98}O$ | None | 16 | $Li_{0.02}Ni_{0.98}O$ |

TABLE 1-continued

| Material for the cathode | Additive to the electrolyte (10 mol %)* | Solubility of Ni (mol ppm) | Composition of the material after the test |
|---|---|---|---|
|  | SrCO$_3$ | 8.9 | $Li_{0.03}Ni_{0.97}O$ |
|  | BaCO$_3$ | 8.7 | $Li_{0.03}Ni_{0.97}O$ |
| NiO | None | 18 | $Li_{0.02}Ni_{0.98}O$ |
|  | SrCO$_3$ | 9.8 | $Li_{0.03}Ni_{0.97}O$ |
|  | BaCO$_3$ | 9.6 | $Li_{0.03}Ni_{0.97}O$ |

*Composition of Standard Electrolyte: 62 mol % $Li_2CO_3$ + 38 mol % $K_2CO_3$

EXAMPLE 2

In this example, an oxide of the composition: $Li_{0.1}Ni_{0.9}O$ was used as the material for the cathode of the molten carbonate fuel cell.

A solution of an auxiliary agent for molding was prepared by dissolving each 3 g of polyvinyl butyral resin as a binder and of di-n-butyl phthalate as a plasticizer in 50 cc of an organic solvent (a 1:1 by volume mixture of ethanol with toluene). The solution of the auxiliary agent for molding was added to 100 g of the oxide powder and mixed well with kneading to prepare a paste. The paste was molded into a green tape by a doctor blading method. The green tape in the sheet state was incorporated in a molten carbonate fuel cell as it was to make a cathode thereof.

A sintered porous plate of Ni—Al alloy powder was used as an anode. An electrolyte retainer of a matrix of lithium aluminate which retained a carbonate electrolyte (lithium carbonate:potassium carbonate=62 mol %:38 mol %) in 60 wt % was used as the electrolyte tile. Further, a gas composed of 80% of hydrogen and 20% of carbon dioxide and humidified at 55° C. was used as the fuel gas; and a gas composed of 70% of air and 30% of carbon dioxide was used as the oxidizing gas, respectively. The characteristics of this molten carbonate fuel cell were evaluated at 650° C.

Figure 1:
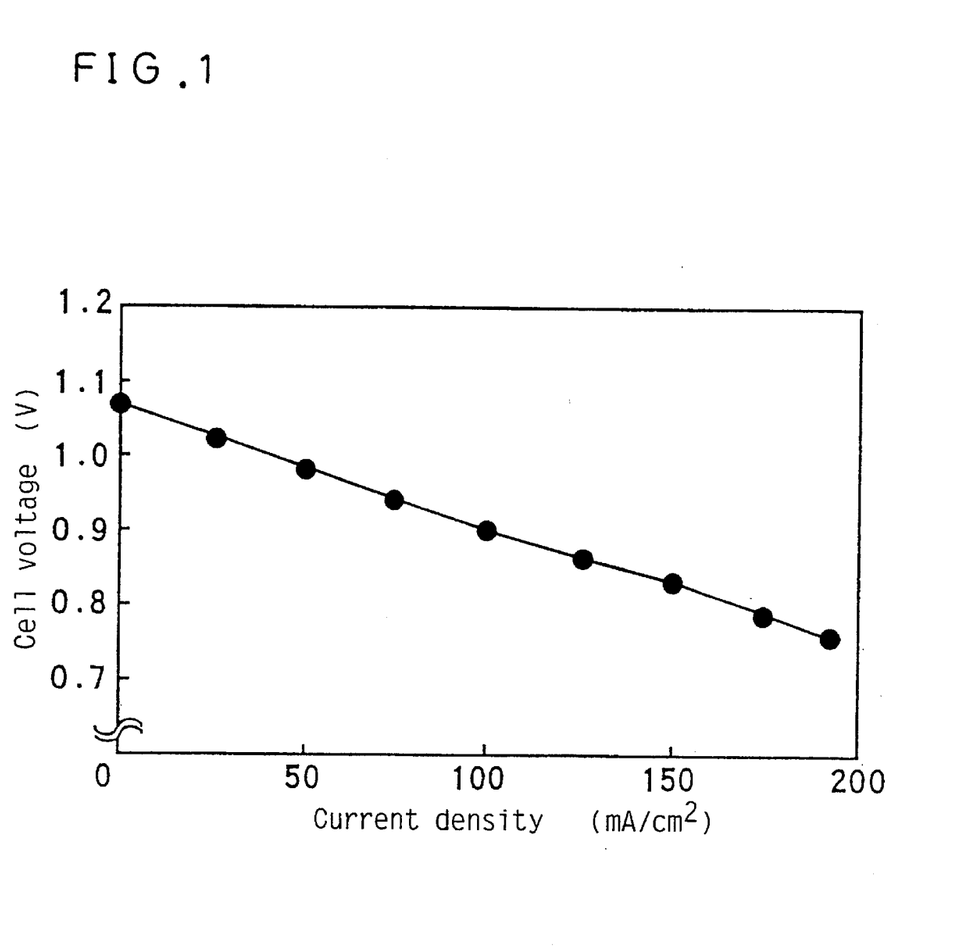
FIG. 1 is a diagram showing a current density-voltage characteristics of a molten carbonate fuel cell built in accordance with Example 2 of the present invention.

FIG. 1 shows the results on the current density-voltage characteristics of the cell. Initial performance (cell voltage) was found to be 0.818 V at a fuel utilization of 70% and a current density of 150 mA/cm². From this result, it was appreciated that the metal oxide of the composition $Li_{0.1}Ni_{0.9}O$ employed in this example had a sufficient oxygen reducing activity as the cathode of the molten carbonate fuel cell. Further, since it was found from Table 1 that the $Li_{0.1}Ni_{0.9}O$ clearly had a small solubility of Ni in the electrolyte, a current-generating test for a long period of time was omitted in this example.

Apart from the above-mentioned example which shows the case of employing the nickel oxide represented by the formula $Li_{0.1}Ni_{0.9}O$ as the cathode material of the molten carbonate fuel cell, a mixture of the nickel oxide and any other oxide, for instance $LiFeO_2$ or $LiCoO_2$ may be employed. Furthermore, it is possible to employ as the cathode material a composite oxide derived from the nickel oxide by substituting Fe or Co for a part of Ni in the nickel oxide.

Moreover, apart from the above-mentioned example in which the green tape in the sheet state including the auxiliary agent for molding and the like was incorporated in the cell as it is, alternatively the green tape may be sintered before the incorporation in the cell.

EXAMPLE 3

In this example, a metal oxide of the composition $Li_{0.1}Ni_{0.9}O$ was used as the material for the cathode of the molten carbonate fuel cell.

Following addition of a solution of an auxiliary agent for molding to the oxide powder, the whole was molded into a green tape of sheet state by a doctor blading method in a manner similar to the case of Example 2. The green tape in the sheet state was incorporated in a molten carbonate fuel cell as it was to make a cathode thereof.

A sintered porous plate of Ni—Al alloy powder was used as an anode. As an electrolyte, one obtained by adding 10 mol % of strontium carbonate to an alkali metal carbonate ($Li_2CO_3:K_2CO_3$=62 mol %:38 mol %) was used. This electrolyte was retained in an electrolyte retainer of a matrix of lithium aluminate at 60 wt % for use as the electrolyte tile. Further, a gas composed of 80% of hydrogen and 20% of carbon dioxide and humidified at 55° C. was used as the fuel gas; and a gas composed of 70% of air and 30% of carbon dioxide was used as the oxidizing gas, respectively. The characteristics of this molten carbonate fuel cell were evaluated at 650° C.

Figure 2:
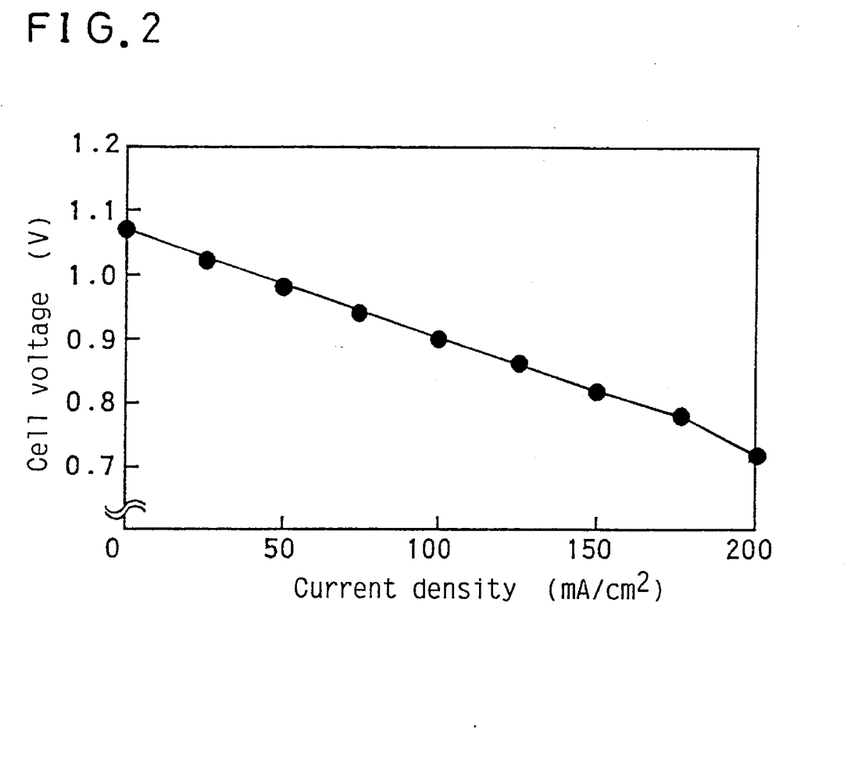
FIG. 2 is a diagram showing a current density-voltage characteristics of a molten carbonate fuel cell built in accordance with Example 3 of the present invention.

FIG. 2 shows the results on the current density-voltage characteristics of the cell. Initial performance (cell voltage) was found to be 0.810 V at a fuel utilization of 70% and a current density of 150 mA/cm². From this result, it was appreciated that the metal oxide of the composition $Li_{0.1}Ni_{0.9}O$ employed in this example had a sufficient oxygen reducing activity as the cathode of the molten carbonate fuel cell.

Figure 3:
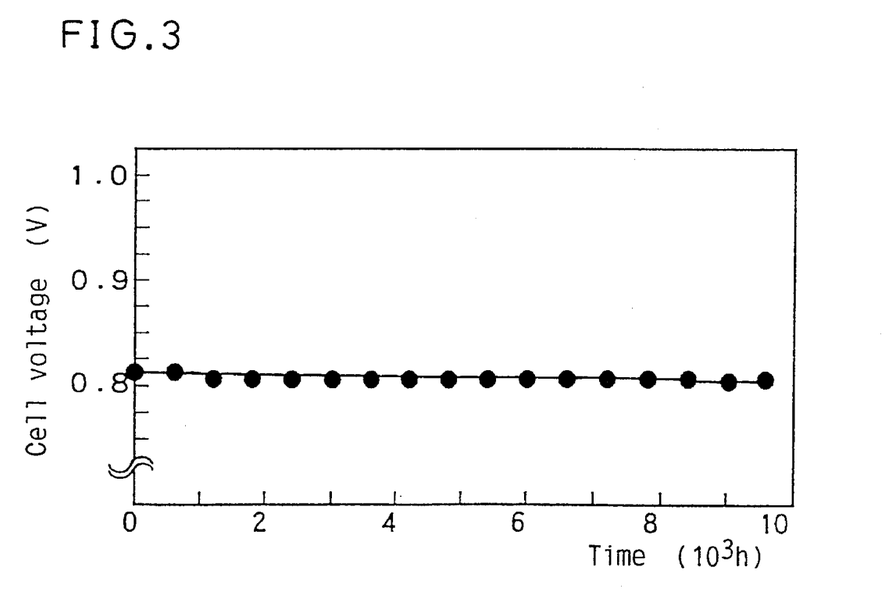
FIG. 3 is a diagram showing a continuous current generating performance of the molten carbonate fuel cell built in accordance with Example 3 of the present invention.

Further, a continuous current-generating test was performed at a fuel utilization of 70% and a current density of 150 mA/cm². FIG. 3 shows the time-voltage characteristics obtained during the continuous current-generating test. It shows a deteriorating rate in the cell voltage as small as 0.2%/1,000 hours which reflects a preferable service life characteristics.

Further, an inspection of the electrolyte carried out by disassembling the cell after the test showed that the electrolyte tile had no deposition of nickel.

EXAMPLE 4

In this example, nickel oxide powder was used as the raw material for the cathode of the molten carbonate fuel cell.

To 100 g of this nickel oxide powder, added were 15 g of lithium carbonate powder, a solution of an auxiliary agent for molding (5 g of the binder, 5 g of the plasticizer and 55 cc of the solvent) similar to the case of Example 2, and the whole was mixed and kneaded into a paste. This paste was molded into a green tape in sheet state by a doctor blading method, and the green tape in the sheet state was incorporated in a molten carbonate fuel cell as it was to make a cathode thereof.

A sintered porous plate of Ni—Al alloy powder was used as an anode. As an electrolyte tile, an electrolyte retainer of a matrix of lithium aluminate which retained an alkali metal carbonate (lithium carbonate:potassium carbonate=62 mol %:38 mol %) at 60 wt % was used and incorporated in the cell.

The temperature of the assembled molten carbonate fuel cell was elevated from room temperature to 650° C. at a rate of 0.5° C./min., while supplying air into a site of the cathode of the cell, and a mixed gas composed of 5% of carbon dioxide, 5% of hydrogen and 90% of argon and humidified at 55° C. into a site of the anode of the cell. Immediately after the cell temperature reached 650° C., the fuel gas to be supplied into the site of the anode was switched to a gas composed of 92% of hydrogen and 8% of carbon dioxide and humidified at 55° C. After 10 hours, the fuel gas was further switched to a gas composed of 80% of hydrogen and 20% of carbon dioxide and humidified at 55° C.; and simultaneously, the oxidizing gas to be supplied into the site of the cathode was switched to a gas Composed of 70% of air and 30% of carbon dioxide for evaluating the characteristics of the molten carbonate fuel cell.

Initial performance (cell voltage) was found to be 0.808 V at a fuel utilization of 70% and a current density of 150 mA/cm².

Further, an investigation of the cathode after the test through disassembling the molten carbonate fuel cell revealed that the material composition of the cathode after the test was $Li_{0.06}Ni_{0.94}O$.

From this results, it was appreciated that a metal oxide of the composition $Li_xNi_{1-xO}$ (0.05<x ) can be synthesized at the time of starting procedure of the cell, by incorporating a porous plate comprising nickel oxide as its main component as the raw material for the cathode at the time of assembling the cell, and by introducing a gas having a carbon dioxide partial pressure of 0.1 or lower during the in-situ oxidation and lithiation at the time of elevating the cell temperature.

Further, it is apparent that a metal oxide of the composition $Li_xNi_{1-xO}$ (0.05<x) can be synthesized at the time of starting procedure of the cell, by incorporating a raw material for the cathode comprising a metal oxide of $Li_xNi_{1-xO}$ (0<x<0.05)in place of nickel oxide as its main component at the time of assembling the cell, and by introducing a gas having a carbon dioxide partial pressure of 0.1 or lower during the in-situ oxidation and lithiation at the time of elevating the cell temperature. Moreover, as the gas to be introduced, a gas having a carbon dioxide partial pressure of 0.1 or lower and an oxygen partial pressure of 0.2 or higher may of course be employed.

EXAMPLE 5

In this example, metal nickel powder was used as the raw material for the cathode of the molten carbonate fuel cell.

To 100 g of this metal nickel powder, added were 15 g of lithium carbonate powder, a solution of an auxiliary agent for molding (5 g of the binder, 5 g of the plasticizer and 55 cc of the solvent) similar to the case of Example 2, and the whole was mixed and kneaded into a paste. This paste was molded into a green tape in sheet state by a doctor blading method, and the green tape in the sheet state was incorporated in a molten carbonate fuel cell as it was to make a cathode thereof.

A sintered porous plate of Ni—Al alloy powder was used as an anode. As an electrolyte tile, an electrolyte retainer of a matrix of lithium aluminate which retained alkali metal carbonate (lithium carbonate: potassium carbonate:barium carbonate=58.9 mol %:36.1 mol %:5 mol %) at 60 wt % was used and incorporated in the cell.

The temperature of the assembled molten carbonate fuel cell was elevated from room temperature to 650° C. at a rate of 0.5° C./min., while supplying a mixed gas composed of 20% of oxygen and 80% of air into a site of the cathode of the cell, and a mixed gas composed of 5% of carbon dioxide, 5% of hydrogen and 90% of argon and humidified at 55° C. into a site of the anode of the cell. Immediately after the cell temperature reached 650° C., the fuel gas to be supplied into the site of the anode was switched to a gas composed of 92% of hydrogen and 8% of carbon dioxide and humidified at 55° C. After additional 10 hours, the fuel gas to be supplied into the site of the anode was further switched to a gas composed of 80% of hydrogen and 20% of carbon dioxide and humidified at 55° C. and simultaneously, the oxidizing gas to be supplied into the site of the cathode was switched to a gas composed of 70% of air and 30% of carbon dioxide for evaluating the characteristics of the molten carbonate fuel cell.

Initial performance (cell voltage) was found to be 0.820 V at a fuel utilization of 70% and a current density of 150 mA/cm$^2$.

Further, an investigation of the cathode after the test through disassembling the molten carbonate fuel cell revealed that the material composition of the cathode after the test was $Li_{0.1}Ni_{0.9}O$.

From these results, it was appreciated that it was possible to synthesize the metal oxide of the composition $Li_xNi_{1-xO}$ (0.05<x) at the time of starting procedure of the cell, by incorporating the raw material for the cathode comprising metal nickel as its main component at the time of assembling the cell, and by introducing a gas having an oxygen partial pressure of 0.2 or higher during the in-situ oxidation and lithiation at the time of elevating the cell temperature.

EXAMPLE 6

In this example, a metal oxide of the composition $Li_{0.16}Ni_{0.84}O$ was used as the raw material for the cathode of the molten carbonate fuel cell.

Following addition of a solution of an auxiliary agent for molding to the oxide powder, the whole was molded into a green tape of sheet state by a doctor blading method in a manner similar to the case of Example 2. The green tape in the sheet state was incorporated in a molten carbonate fuel cell as it was to make a cathode thereof.

A sintered porous plate of Ni—Al alloy powder was used as an anode. As an electrolyte, one obtained by adding 10 mol % of barium carbonate to an alkali metal carbonate ($Li_2CO_3$:$K_2CO_3$=62 mol %:38 mol %) was used. This electrolyte was retained in an electrolyte retainer of a matrix of lithium aluminate at 60 wt % for use as the electrolyte tile. Further, a gas composed of 80% of hydrogen and 20% of carbon dioxide and humidified at 55° C. was used as the fuel gas; and a gas composed of 70% of air and 30% of carbon dioxide was used as the oxidizing gas, respectively. The characteristics of this molten carbonate fuel cell were evaluated at 650° C.

Figure 4:
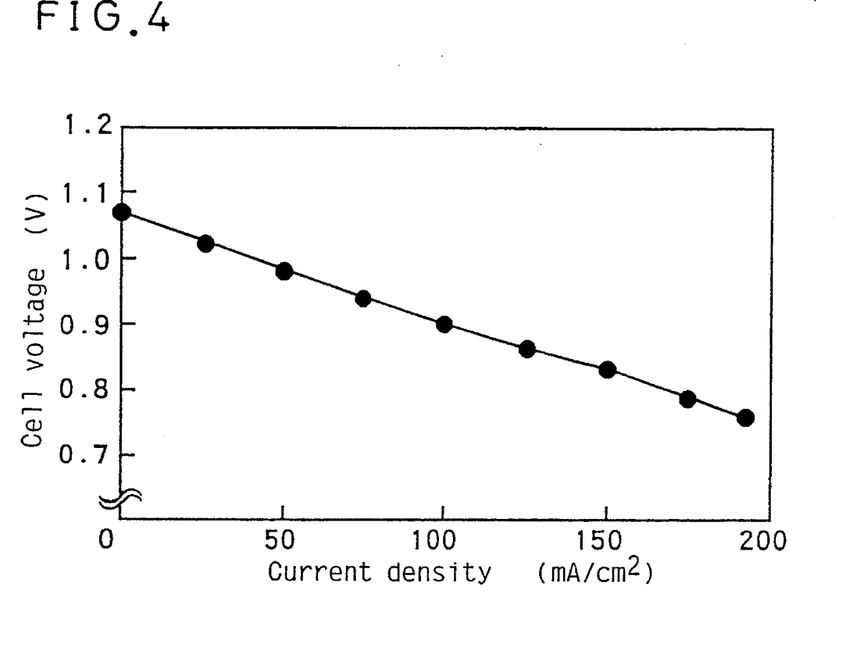
FIG. 4 is a diagram showing a current density-voltage characteristics of a molten carbonate fuel cell built in accordance with Example 6 of the present invention.

FIG. 4 shows the results of the measurements on the current density-voltage characteristics of the cell. Initial performance (cell voltage) was found to be 0.820 V at a fuel utilization of 70% and a current density of 150 mA/cm$^2$. From this result, it was appreciated that the metal oxide of the composition $Li_{0.2}Ni_{0.8}O$ employed in this example had a sufficient oxygen reducing activity as the cathode of the molten carbonate fuel cell.

Figure 5:
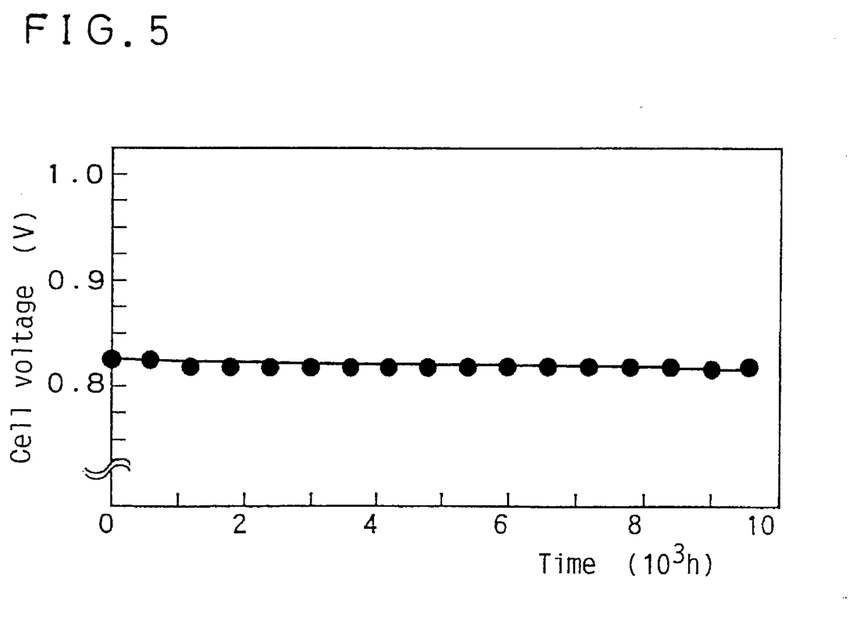
FIG. 5 is a diagram showing a continuous current generating performance of the molten carbonate fuel cell built in accordance with Example 6 of the present invention.

Further, a continuous current-generating test was performed at a fuel utilization of 70% and a current density of 150 mA/cm$^2$. FIG. 5 shows the time-voltage characteristics obtained during the continuous current-generating test. It shows a deteriorating rate in the cell voltage as small as 0.1%/1,000 hours which reflects a preferable service life characteristics.

Further, an inspection of the electrolyte carried out by disassembling the cell after the test showed that the electrolyte had no deposition of nickel.

EXAMPLE 7

In this example, nickel oxide powder was used as the raw material for the cathode of the molten carbonate fuel cell.

To one mole of this nickel oxide powder, added were 0.4 mole of lithium hydroxide powder, a solution of an auxiliary agent for molding (7 g of the binder, 7 g of the plasticizer and 55 cc of the solvent) similar to the case of Example 2, and the whole was mixed and kneaded into a paste. This paste was molded into a green tape of sheet state by a doctor blading method, and the green tape in the sheet state was incorporated in the cell as it was to make a cathode thereof.

A sintered porous plate of Ni—Al alloy powder was used as an anode. As an electrolyte, one obtained by adding 5% of barium carbonate to an alkali metal carbonate ($Li_2CO_3$:$K_2CO_3$=62 mol %:38 mol %) was used. This electrolyte was retained in an electrolyte retainer of a matrix of lithium aluminate at 60 wt % and incorporated in the cell as its electrolyte tile.

The temperature of the assembled molten carbonate fuel cell was elevated from room temperature to 460° C. at a rate of 1° C./min., while supplying air into a site of the cathode of the cell, and on the other hand, supplying a mixed gas composed of 5% of carbon dioxide, 5% of hydrogen and 90% of argon and humidified at 55° C. into a site of the anode of the cell. After once keeping the temperature at 460° C. for 10 hours, the cell temperature was elevated again from 460° C. to 650° C. at a rate of 0.5° C./min. Immediately after the cell temperature reached 650° C., the fuel gas to be supplied into the site of the anode was switched to a gas composed of 95% of hydrogen and 5% of carbon dioxide and humidified at 55° C. After an additional 10 hours, the fuel gas was further switched to a gas composed of 80% of hydrogen and 20% of carbon dioxide and humidified at 55° C.; and simultaneously, the oxidizing gas to be supplied into the site of the cathode was switched to a gas composed of 70% of air and 30% of carbon dioxide for evaluating the characteristics of the molten carbonate fuel cell.

Initial performance (cell voltage) was found to be 0.815 V at a fuel utilization of 70% and a current density of 150 mA/cm$^2$. Further, an investigation on the cathode after the test performed by disassembling the molten carbonate fuel cell revealed that the material composition of the cathode was $Li_{0.18}Ni_{0.82}O$.

From this results, it was appreciated that a cathode material comprising an oxide represented by the formula $Li_xNi_{1-xO}$ (0.05≦x<0.5) as its main component can be synthesized, by selecting metal or oxide including at least nickel as its main component as the raw material for the cathode and configuring the cathode by mixing at least lithium hydroxide with the raw material at the time of assembling the cell, and by introducing a gas having a carbon dioxide partial pressure of 0.1 or lower during the in-situ oxidation and lithiation at the time of elevating the cell temperature.

EXAMPLE 8

In this example, nickel hydroxide powder was used as the raw material for the cathode of the molten carbonate fuel cell.

To one mole of this nickel hydroxide powder, added were 0.5 mole of lithium hydroxide powder, a solution of an auxiliary agent for molding (8 g of the binder, 8 g of plasticizer and 60 cc of the solvent) similar to the case of Example 2, and the whole was mixed and kneaded into a paste. This paste was molded into a green tape of sheet state by a doctor blading method, and the green tape in the sheet state was incorporated in a molten carbonate fuel cell as it was to make a cathode thereof.

A sintered porous plate of Ni—Al alloy powder was used as an anode. As an electrolyte, one obtained by adding 5 mol % of strontium carbonate to an alkali metal carbonate ($Li_2CO_3$:$K_2CO_3$=62 mol %:38 mol %) was used. This electrolyte was retained in an electrolyte retainer of a matrix of lithium aluminate at 60 wt % and incorporated in the cell as its electrolyte tile.

The temperature of the assembled molten carbonate fuel cell was elevated from room temperature to 450° C. at a rate of 1° C./min. while supplying a mixed gas composed of 20% of oxygen and 80% of air into a site of the cathode of the cell and another mixed gas composed of 5% of carbon dioxide, 5% of hydrogen and 90% of argon and humidified at 55° C. into a site of the anode of the cell. After once keeping the temperature at 450° C. for 12 hours, the cell temperature was elevated again from 450° C. to 650° C. at a rate of 0.5° C./min. Immediately after the cell temperature reached 650° C., the fuel gas to be supplied into the site of the anode was switched to a gas composed of 95% of hydrogen and 5% of carbon dioxide and humidified at 55° C. After additional 10 hours, the fuel gas was further switched to a gas composed of 80% of hydrogen and 20% of carbon dioxide and humidified at 55° C.; and simultaneously, the oxidizing gas to be supplied into the site of the cathode was switched to a gas composed of 70% of air and 30% of carbon dioxide for evaluating the characteristics of the molten carbonate fuel cell.

Initial performance (cell voltage) was found to be 0.818 V at a fuel utilization of 70% and a current density of 150 mA/cm². Further, an investigation of the cathode after the test through disassembling the molten carbonate fuel cell revealed that the material composition of the cathode after the test was $Li_{0.3}Ni_{0.7}O$.

From this results, it was appreciated that a cathode material comprising a metal oxide represented by the formula $Li_xNi_{1-x}O$ (0.05≦x<0.5) as its main component was able to be synthesized, by selecting the raw material for the cathode of nickel hydroxide as its main component and configuring the cathode by mixing at least lithium hydroxide with the raw material at the time of assembling the cell, and by introducing a gas having a carbon dioxide partial pressure of 0.1 or lower and an oxygen partial pressure of 0.2 or higher during the in situ oxidation and lithiation at the time of elevating the cell temperature.

In this example, the gas to be supplied into the site of the cathode may of course be in any case that satisfies only either one condition of having a carbon dioxide partial pressure of 0.1 or lower, or the other condition of having an oxygen partial pressure of 0.2 or higher.

EXAMPLE 9

In this example, metal nickel powder was used as the raw material for the cathode of the molten carbonate fuel cell.

A solution of an auxiliary agent for molding was added to this metal nickel powder to prepare a paste and the paste was molded into a state of sheet by a doctor blading method in a manner similar to the case of Example 2. The molded sheet was then sintered under a reducing atmosphere at 900° C. to obtain a cathode plate. After impregnating the cathode plate with a dispersion of lithium hydroxide in a solvent followed by drying, the impregnated cathode plate was incorporated in the cell.

A sintered porous plate of Ni—Al alloy powder was used as an anode. As an electrolyte, one obtained by adding 5 mol % of strontium carbonate to an alkali metal carbonate ($Li_2CO_3$:$K_2CO_3$=62 mol %:38 mol %) was used. This electrolyte was retained in an electrolyte retainer of a matrix of lithium aluminate at 60 wt % and incorporated in the cell as the electrolyte tile.

The temperature of the assembled molten carbonate fuel cell was elevated from room temperature to 470° C. at a rate of 1° C./min. while supplying a mixed gas composed of 20% of oxygen and 80% of air into a site of the cathode of the cell and on the other hand, supplying a mixed gas composed of 5% of carbon dioxide, 5% of hydrogen and 90% of argon and humidified at 55° C. into a site of the anode of the cell. After once keeping the temperature at 470° C. for 12 hours, the cell temperature was elevated again from 470° C. to 650° C. at a rate of 0.5° C./min. Immediately after the cell temperature reached 650° C., the fuel gas to be supplied into the site of the anode was switched to a gas composed of 95% of hydrogen and 5% of carbon dioxide and humidified at 55° C. After additional 10 hours, the fuel gas was further switched to a gas composed of 80% of hydrogen and 20% of carbon dioxide and humidified at 55° C., and simultaneously, the oxidizing gas to be supplied into the site of the cathode was switched to a gas composed of 70% of air and 30% of carbon dioxide for evaluating the characteristics of the molten carbonate fuel cell.

Initial performance (cell voltage) was found to be 0.816 V at a fuel utilization of 70% and a current density of 150 mA/cm².

Further, an investigation of the cathode after the test through disassembling the molten carbonate fuel cell revealed that the material composition of the cathode after the test was $Li_{0.19}Ni_{0.81}O$.

EXAMPLE 10

In this example, an oxide of the composition $Li_{0.18}Ni_{0.82}O$ was used as the material for the cathode of the molten carbonate fuel cell.

To 100 g of this oxide powder, added were 15 g of strontium carbonate powder, a solution of an auxiliary agent for molding (5 g of the binder, 5 g of the plasticizer and 55 cc of the solvent) similar to the case of Example 2; and the whole was mixed and kneaded into a paste. This paste was molded into a green tape of sheet state by a doctor blading method, and the green tape in the sheet state was incorporated in a molten carbonate fuel cell as it was to make a cathode thereof.

A sintered porous plate of Ni—Al alloy powder was used as an anode. As an electrolyte, an alkali metal carbonate ($Li_2CO_3$:$K_2CO_3$=62 mol %:38 mol %) was used. This electrolyte was retained in an electrolyte retainer of a matrix of lithium aluminate at 60 wt % and was used as the electrolyte tile. A mixed gas composed of 80% of hydrogen and 20% of carbon dioxide and humidified at 55° C. was used as the fuel gas; and on the other hand, a mixed gas composed of 70% of air and 30% of oxygen was used as the oxidizing gas, respectively. The characteristics of this molten carbonate fuel cell was evaluated at 650° C.

Initial performance (cell voltage) was found to be 0.821 V at a fuel utilization of 70% and a current density of 150 mA/cm². From this result, it was appreciated that the metal oxide of the composition $Li_{0.18}Ni_{0.82}O$ employed in this example was found to have a sufficient oxygen reducing activity as the cathode of the molten carbonate fuel cell.

Further, a continuous current-generating test was made. The result after performing 10,000 hours of test at a fuel utilization of 70% and a current density of 150 mA/cm$^2$ shows such a low deteriorating rate in the cell voltage as low as 0.15%/1,000 hours, which reflects a preferable service life characteristic.

Further, an inspection of the electrolyte carried out by disassembling the cell after the test showed that the electrolyte had no deposition of nickel. Moreover, as a result of a quantitative analysis on the cathode material after the test, it was found that material had a composition equal to $Li_{0.10}Ni_{0.90}O$.

It is understood that various other modifications will be apparent to and can be readily made by those skilled in the art to which this invention pertains without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof, by those skilled in the art to which this invention pertains.

What is claimed is:

1. A molten carbonate fuel cell comprising:
   an anode and a cathode which are both porous gas-diffusion electrodes, and
   an electrolyte making contact with both the electrodes, wherein
      said cathode comprises a metal oxide represented by the formula $Li_xNi_{1-x}O$ ($0.05 \leq x < 0.5$), and
      at least one of said cathode and electrolyte contains an alkaline earth metal carbonate.

2. The molten carbonate fuel cell in accordance with claim 1, wherein said cathode comprises a metal oxide represented by the formula $Li_xNi_{1-x}O$ ($0.05 \leq x < 0.2$).

3. The molten carbonate fuel cell in accordance with claim 2, wherein said cathode comprises a metal oxide represented by the formula $Li_xNi_{1-x}O$ ($0.1 \leq x < 0.2$).

4. The molten carbonate fuel cell in accordance with claim 1 or 2, wherein said alkaline earth metal carbonate is strontium carbonate or barium carbonate.

5. The molten carbonate fuel cell in accordance with claim 4, wherein said electrolyte contains 1–10 mole % of said alkaline earth metal carbonate.

6. The molten carbonate fuel cell in accordance with claim 4, wherein said cathode contains 1–20% by weight of said alkaline earth metal carbonate.

* * * * *